United States Patent Office 2,917,506
Patented Dec. 15, 1959

2,917,506

COLD WATER SOLUBLE AMINO ALKYL ETHERS OF STARCH

Carlyle G. Caldwell, North Plainfield, and Otto B. Wurzburg, Whitehouse Station, N.J., assignors to National Starch and Chemical Corporation, a corporation of Delaware No Drawing. Application November 21, 1956
Serial No. 623,554

12 Claims. (Cl. 260—234)

This invention relates to a method for producing cold water soluble amino alkyl ethers of starch, and to the improved products thus produced.

An object of our invention is the production of starch derivatives characterized by improved stability of their aqueous dispersions, that is, derivatives which maintain their viscosity with markedly less thickening or gelling upon storage, as compared to dispersions of the corresponding untreated starches. Another object is the production of starch derivatives whose aqueous dispersions are particularly resistant to the deleterious effects of low pH values. Still another object is the production of starch derivatives which are of value as wet end additives in the manufacture of paper, and which notably increase the strength of the finished paper. It is our object to produce such derivatives in a dry, but cold water soluble state, and, if desired, in a condition of high purity.

We are of course aware that starch ethers per se have been made in the past, and that cold water soluble starch derivatives have also been known. But our invention involves the unpredicted discovery that the treatment of starch under specified conditions with a particular class of etherification agents capable of introducing amine groups, and not merely any amine groups but specifically the tertiary amines, together with the gelatinization and drying of these products, results in cold water soluble tertiary amine ethers of starch which have remarkably improved properties.

Our invention may be described in general terms as follows:

Starch, in the presence of at least 10% water based upon the weight of the anhydrous starch, and preferably in aqueous suspension, is treated in the presence of an alkaline medium with an etherification reagent capable of introducing a tertiary amine group, the reagent being selected from those corresponding to the structural formula:

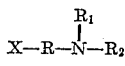

where X is a halogen atom or an ethylenic oxide

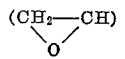

group, R is an alkylene group containing from 1 to 3 carbon atoms, and $R_1$ and $R_2$ are alkyl groups containing from 1 to 4 carbon atoms. The product of this reaction is a tertiary amino alkyl ether of starch, and it may be gelatinized or may still be in the original granule form, depending upon the conditions under which the reaction took place. The starch ether thus produced is then treated in one of the following ways:

(1) An aqueous suspension of the starch product is passed over heated revolving drums at a temperature sufficient to dry the starch and, if there are ungelatinized starch granules present, to gelatinize and dry the same.

(2) If the starch ether is in ungelatinized form, an aqueous suspension of the granules may be passed through a system of tubes under heat and pressure, in order to pregelatinize the starch, and the gelatinized dispersion is then dried over revolving heated drums. A preferred mechanism for gelatinizing the starch product in tubes under heat and pressure is the "Votator," a mechanism made and sold by the Girdler Corporation, Louisville, Ky.

(3) If the starch ether is ungelatinized, it may first be purified by filtration and thorough washing with water, and the thus purified product, in aqueous suspension, is then pregelatinized, followed by passage of the gelatinized product over heated revolving drums. Alternatively, an aqueous suspension of the purified starch may be passed directly over the heated drums, without pregelatinization, the drums being heated to a temperature sufficient to gelatinize and dry the starch product.

The process will now be described in greater detail.

As the starch to be treated by our process we may use any amylaceous substance such as untreated starch, or a starch derivative as for example a dextrinized, hydrolized, oxidized, esterified or etherified starch which still retains a substantial proportion of amylaceous substance (as contrasted to a starch which has been degraded to a point where it is essentially all monosaccharide sugar). The starch may be derived from any source, including corn, wheat, potato, tapioca, waxy maize, sago and rice.

The structural formula for the etherification reagent has been given above. Examples of tertiary amine etherification reagents falling within the scope of that formula are the dialkyl amino alkyl halides and the dialkyl amino alkyl epoxides. Representative examples of reagents suitable for use in our process are b-diethyl amino ethyl chloride, b-dimethyl amino isopropyl chloride, b-dimethyl amino ethyl chloride and 3-dibutyl amino 1,2 epoxypropane. The various halides (i.e., chloro-, bromo-, etc.) can be used interchangeably.

In the above-listed reagents, where we have indicated the free amines (e.g., b-diethyl amino ethyl chloride), we can also use the hydrochloride or other salts of these reagents (e.g., b-diethyl amino ethyl chloride hydrochloride). In fact, we ordinarily prefer to use the salts, since these are often more satisfactory and convenient to handle. The hydrochloride moiety takes no part in the etherification reaction.

It will be further noted that the etherification reagents used in our process are all tertiary amines. After long experimental work, we have found that only the tertiary amines, for unpredicted and unexplained reasons, have the effect of imparting the herein described improvements to starches.

Broadly, the cold water soluble product of our process may be described by the following structural formula:

wherein Y is starch, R is a radical selected from the group consisting of alkylene and hydroxyalkylene radicals, and each of $R_1$ and $R_2$ is an alkyl radical. R may contain from 1 to 5 carbon atoms and $R_1$ and $R_2$ may each contain from 1 to 4 carbon atoms.

ETHERIFICATION

As the first step in our process, starch is suspended in water, to which has been added (either before or after the addition of the starch) sufficient strong base, selected from the group alkali metal hydroxides, alkaline earth hydroxides (and particularly calcium hydroxide) and quaternary ammonium hydroxide, to maintain the mixture in an alkaline state during the reaction. The required amount of the tertiary amine etherification reagent is then added, with constant agitation. The reaction time will vary, in the light of the degree of substitution desired, the reactivity of the particular reagent chosen, and the amount of heat applied, if any. As is often the case in chemical reactions, a time-temperature relationship applies, with increased temperatures ordinarily resulting in more rapid reaction.

At this stage of the process, the starch may or may not have been gelatinized. It is well known that starch, which in its natural state is in the form of discrete granules, will in the presence of water and sufficient heat and/or alkali undergo gelatinization (that is, an irreversible swelling, bursting and dispersal of the granules). In some cases, as will be seen from the subsequent steps in our process, it is desired to have an ungelatinized starch product at this point. This may be accomplished by maintaining the alkali concentration and temperature at a point below that which causes gelatinization. These values differ with each starch type, and therefore cannot be stated as absolute numbers, but for any given starch it is a matter of simplest experimentation to determine at what degree of alkalinity and heat gelatinization occurs. If considerable alkali is used, and it is nevertheless desired to avoid gelatinization, this can be accomplished by adding a known gelatinization retarding chemical, such as sodium sulfate.

COLD WATER SOLUBILIZING AND DRYING (a) The aqueous reaction mass resulting from the above-described etherification procedure, containing the starch derivative in gelatinized or ungelatinized form, may be passed over revolving heated drums. The temperatures and speed of rotation of the drums is so adjusted, that the starch suspension, which is poured onto the drums, is completely dried by the time it is removed. If the starch suspension contains any substantial proportion of ungelatinized starch particles, the temperature of the drums must be sufficient so that the particles are gelatinized as well as dried. In either case, the dried product may be ground to the desired degree of fineness, and it is found to be readily soluble in cold water to form relatively stable dispersions.

(b) If the starch derivative resulting from the etherification is in the form of ungelatinized granules (suspended in the liquid of the reaction mass) it may be pregelatinized before drum drying. Pregelatinization may be effected by merely heating the suspension of starch granules beyond the gelatinization temperature of the particular starch product, or by passing the aqueous suspension of ungelatinized starch derivative through tubes, heated by steam or otherwise, beyond the gelatinization temperature of the starch. A preferred starch-cooking mechanism of this type is the previously mentioned "Votator." Various other means of gelatinizing starch are available and suitable for the purpose of our process, as for example the so-called jet-cookers or homogenizers, which subject the starch to the action of heat, pressure, and even in some cases a grinding action, expelling a stream gelatinized material.

However the gelatinization may be effected, the result is a gelatinized dispersion of the starch ether. This is then passed over revolving heated drums, to dry the product, which is then ground to the desired fineness. Pregelatinization before drying is ordinarily preferred, because it has been found that a more thoroughly gelatinized product is thus produced than is ordinarily obtainable when one relies on the heated drums to gelatinize as well as dry the starch. Because the starch is more thoroughly gelatinized, the resulting dry product is more readily dissolved in cold water to give smooth, stable dispersions.

(c) Another, and preferred, variation of our process involves the purification of the ungelatinized starch ether before gelatinization and drying. By this method, the etherification of the starch is conducted under conditions of temperature and alkalinity so as to avoid gelatinization (or a gelatinization retarding chemical is employed). The ungelatinized starch ether is then freed of salts and other impurities by filtering, and washing the filtered starch with water. This washing and filtration may be repeated if desired until the desired degree of purity is achieved. After the final filtration the purified starch is resuspended in water, and the suspension is then passed over or between heated drums, to achieve gelatinization and drying, or preferably is first pregelatinized as described under (b) and the gelatinized dispersion is then dried over drums. The resulting product is ground to suitable fineness. It has been found that the absence of salts and other impurities is a marked advantage in some industrial applications of the product.

While we have spoken above of drum-drying the starch derivative, it should be emphasized that other equivalent methods of drying the gelatinized starch may be employed. Thus, for example, a dispersion of the gelatinized starch ether may be spray dried, resulting in the cold water soluble dry starch ether.

It is also possible to conduct the original etherification reaction in the absence of added water, other than that which is normally present in the commercially dry starch. By this variation, the starch is suspended in an inert medium such as isopropyl alcohol. The etherification reagent is then added, together with an alkaline material selected from the group of powerful alkalis previously mentioned. The mixture is heated at reflux temperatures to complete the etherification reaction, and the ether (in ungelatinized form) is easily filtered off. We do not ordinarily prefer this non-aqueous method of etherification, because it means that the starch ether must subsequently be mixed with water before the gelatinization and drying steps can be effected.

PROPORTIONS

It has already been pointed out that the amount of water during the etherification reaction should be at least 10%, based on the anhydrous weight of the starch (this being the approximate amount of moisture present in commercially "dry" starch). If the starch is suspended in water during the etherification reaction, the minimum amount of water is obviously that which will serve to suspend the starch, whereas there is no maximum limit to the amount of water that may be present. From the practical point of view, however, one would not use more water in forming the suspension than was actually necessary to permit easy handling, since any excess would only creat inefficiencies in the subsequent dewatering. Similarly, when the starch ether is gelatinized and dried, on drums or otherwise, the minimum amount of water required is that which will permit gelatinization, this amount usually being at least 40% of water based on the anhydrous starch. Here again there is no actual maximum, except that one would ordinarily keep the amount of water at a minimum consistent with efficient handling on the drums or other drying devices.

The amount of alkali hydroxide or quaternary ammonium hydroxide present in the etherification reaction mass should be sufficient to achieve a pH of at least about 10 at the commencement of the reaction, and should be sufficient to maintain the reaction mass at an alkaline value (i.e., above pH 7) until the etherification is complete.

With regard to the amount of etherification reagent to be used, this will vary with the particular reagent employed (since they vary in reactivity and reaction efficiency) and the degree of substitution desired. Thus, we have obtained cold water soluble ethers with substantially improved properties by employing as little as 0.5% etherification reagent, based on the weight of the starch, and on the other hand have successfully employed quantities as high as 30%, as will be seen from the examples. Even amounts as low as 0.1% have resulted in perceptible improvements.

The following examples will further illustrate the embodiment of our invention:

Example I

In this, as well as the subsequent examples, all parts given are by weight, unless otherwise specified.

This example illustrates the use of b-diethyl amino ethyl chloride hydrochloride with corn starch.

Four lbs. calcium hydroxide were dissolved in 150 lbs. water, and there were added, with continuous agitation, 100 lbs. corn starch. When the suspension was uniform, there was added a solution of 4 lbs. b-diethyl amino ethyl chloride hydrochloride in 25 lbs. water. Agitation was maintained for 24 hours, at which time enough dilute hydrochloric acid solution was added to adjust the pH to approximately 3. At this point it was found that the starch derivative was substantially ungelatinized.

The suspension was then passed between revolving drums heated at a steam pressure of approximately 160 lbs., and the thus dried product was scraped off the drums and ground to a fineness of approximately 100 mesh.

The product dispersed readily in water at room temperature. Thus, one part of the product dispersed in 12 parts of water to give a relatively clear solution, which displayed considerably less tendency to thicken and gel upon standing than a corresponding dispersion made by cooking an untreated starch.

Example II

Example I was repeated, except that the etherification product was not neutralized, but rather was drum dried on the alkaline side. Thus, the final product contained the free amine group rather than the amine salt (the salt having been formed in Example I by the neutralization with HCl).

Example I was again repeated, except that b-diethyl amino ethyl chloride was used. It is usually found more convenient to use the amine reagent in the form of its salt.

Similarly, we repeated Example I again, using b-dimethyl amino ethyl chloride hydrochloride as the etherification reagent.

In all cases, cold water dispersible products were produced which were comparable in properties to the product of Example I, including the property of viscosity stability. They were found to be of particular value as beater additives in the manufacture of paper.

Example III

The proportions and procedures of Example I were repeated, except that in one case we used tapioca starch; in another case we used corn starch which had been oxidized with sodium hypochlorite solution to a degree known in the trade as 87 fluidity; in the third case we used a corn starch which had been acid-converted to a degree known in the trade as 60 fluidity. Like the product of Example I, the products were all cold water dispersible starch ethers, possessing the improved properties already described.

Example IV

This example illustrates the making of an ungelatinized starch ether as an intermediate product, using b-dimethyl amino isopropyl chloride hydrochloride, followed by various alternative purification and cold water solubilization steps.

One lb. of potassium hydroxide was dissolved in 150 lbs. water, to which were then added 100 lbs. of corn starch which had been acid-converted to a degree known in the trade as 60 fluidity. Constant agitation was maintained, and when the suspension was uniform, there was added a solution of ½ lb. b-dimethyl amino isopropyl chloride hydrochloride in 10 lbs. water. Agitation was maintained at 90° F. overnight, whereupon the mixture was neutralized with dilute hydrochloric acid. At this point the starch ether was present in the form of the original, discrete, ungelatinized granules, because neither the alkalinity nor the temperature was such as to cause gelatinization.

The suspension of ungelatinized starch ether in water was then passed over revolving drums heated at a steam pressure of approximately 160 lbs., resulting in the gelatinization and drying of the product.

(a) In one variation of this example, the suspension of ungelatinized starch ether in water was forced through tubes externally heated by superatmospheric steam, and the gelatinized starch derivative thus ejected was then passed over heated revolving drums.

(b) In another variation of this example, the ungelatinized suspension of starch ether in water was diluted to 10% solids and heated at 190° F., with agitation for one hour, resulting in the gelatinization of the starch product, which was then passed over heated revolving drums.

(c) In still another variation of this example, the ungelatinized suspension of the starch ether was filtered, resuspended in water and filtered again. The washed starch was then resuspended in water. The starch suspension was then pregelantinized by passing through a "Votator," and the gelatinized dispersion was then dried over revolving heated drums.

(d) In another variation, the gelatinized dispersion of (c) was spray dried instead of drum dried.

(e) In yet another variation, the suspension of purified ungelatinized starch ether of (c) in water was passed directly over revolving drums heated at a steam pressure of approximately 150 lbs., resulting in the gelatinization and drying of the product.

In each of the above variations, a cold water soluble starch ether was obtained which was substantially improved over the corresponding untreated starch, with regard to viscosity stability, usefulness as a paper beater additive and in many other respects. However, it was found that the absence of extraneous salts in (c), (d), (e) proved advantageous for some industrial applications. Furthermore, those products which had been pregelatinized before drying tended to disperse more readily to give uniform, lump-free dispersions in cold water.

Equally good results were obtained when, in the etherification step, we used 2 lbs. of calcium hydroxide in place of the 1 lb. of potassium hydroxide.

Example V

This example illustrates the use of an epoxy alkyl amine etherifying reagent with corn starch, to produce a cold water soluble product.

Four lbs. sodium hydroxide were dissolved in 150 lbs. water, and 50 lbs. sodium sulfate were added. Agitation was continued until a clear solution was obtained, and there were then added, with constant agitation, 100 lbs. corn starch. When the suspension was uniform, there was added a solution of 4 lbs. of 3 dibutyl amino 1,2 epoxypropane in 25 lbs. water. Agitation was maintained for 24 hours, at which time the pH was adjusted with dilute hydrochloric acid to approximately 3. The starch derivative at this point was ungelatinized, due to the presence of the sodium sulfate during the reaction.

The water was then filtered off, and the starch washed and resuspended in water. This suspension was then heated at 190° F., with agitation, until the starch derivative was thoroughly gelatinized, and the dispersion was then passed over heated revolving drums. The dried product, ground to a fineness of approximately 100 mesh, was found to be readily dispersible in water at room temperatures to give a relatively clear, stable, sol.

Example VI

This example illustrates the use of a relatively high proportion of reagent, with tapioca starch, to produce a dry, cold water soluble material with valuable adhesive properties.

150 lbs. of b-diethyl amino ethyl chloride hydrochloride were dissolved in 3,000 lbs. water. 500 lbs. of tapioca starch were added, and when uniform there were added 300 parts of a 25% aqueous solution of sodium hydroxide. Agitation was maintained continuously for 10 hours. The pH of the mixture was then adjusted with dilute HCl solution to between 5.5–6.5. This gelatinized dispersion was dried over revolving drums, heated at a steam pressure of approximately 120 lbs., and the product ground to a uniform flour-like texture. When mixed with cold water, a cohesive dispersion was obtained, with excellent adhesive qualities.

*Example VII*

This example illustrates the preparation of a cold water soluble quaternary ammonium salt of a tertiary amine starch ether.

Four lbs. sodium hydroxide were dissolved in 150 lbs. water, and 50 lbs. sodium sulfate were added. After these materials were dissolved, there were added, with continuous agitation, 100 lbs. corn starch. When the suspension was uniform, there was added a solution of 4 lbs. b-diethyl amino ethyl chloride hydrochloride in 25 lbs. water. Agitation was maintained for 24 hours, and the pH was then adjusted with dilute HCl to approximately 3. The ungelatinized starch ether was then filtered, washed with water and dried. 20 parts of the dry product were suspended in 100 parts of ethanol containing 10 parts of methyl iodide. The suspension was heated at reflux for 2 hours, and then allowed to cool, whereupon the starch was filtered and dried under vacuum. This product was then resuspended in water, heated to gelatinize the granules, and passed over heated revolving drums, thus obtaining a dry, cold water soluble product. This product was the quaternary ammonium salt of the starch ether, and may be represented diagrammatically by the following formula:

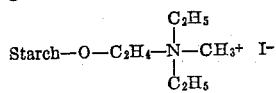

*Example VIII*

This example illustrates the treatment of sago starch with a tertiary amine etherification reagent to produce a cold water soluble starch ether of particular value as a paper beater size.

Three lbs. sodium hydroxide were dissolved in 150 lbs. water, and 30 lbs. sodium sulfate were added. To this solution there were added, with constant agitation, 100 lbs. sago starch. When the suspension was uniform, there was added a solution of 2 lbs. of b-diethyl amino ethyl chloride hydrochloride in 25 lbs. water. The suspension was heated at 120° F. overnight, with constant agitation, at which time the pH was adjusted with dilute HCl to approximately 3. The ungelatinized starch ether was filtered, washed thoroughly with water, resuspended in water, gelatinized by passing through a "Votator," and the gelatinized dispersion then dried over heated revolving drums. The product, after grinding to suitable degree of fineness, was readily soluble in water at room temperatures.

*Example IX*

This example illustrates the use of the products of our invention as additives to paper beater pulps.

In the course of the paper making process, there was added to the pulp in the beater, 0.1%, based on the dry weight of the pulp, of the dry product of Example IV (we employed the product which had been washed and pregelatinized prior to drum drying). The procedure for paper making was carried forward in the usual manner. It was found that the resulting paper was substantially stronger, and was characterized by greater retention of the starch on the paper fibers as well as greater retention of the filler (i.e. clay, titanium dioxide, etc.) as compared to a corresponding paper made without the use of this additive.

Depending upon the particular type of paper being produced, and the operating conditions, the amount of starch ether additive was varied from about 0.1% to about 4%, based on the dry weight of the pulp.

The fact that the product of our invention can be added in the dry form directly to the paper beaters, without any necessity for precooking or other processing by the paper manufacturer, is of real importance, since it eliminates the time, labor and expense required for the precooking of most other additives.

We have already indicated that an essential aspect of our invention involves the unpredicted discovery that the treatment of starch with a particular class of etherification agents capable of introducing tertiary amine groups (as contrasted to primary and secondary amine groups), together with the gelatinization and drying of the resultant products, gives cold water soluble starch ethers characterized by remarkably improved properties. One of these properties is viscosity stability—that is, the increased ability of the aqueous dispersions of the starch products to resist thickening and gelling upon standing, as compared with corresponding dispersions of the untreated starches.

To indicate the remarkable difference in viscosity stability as between starches treated with primary, secondary and tertiary amine reagents, respectively, we compared three such products. In each case corn starch was suspended in water containing 2% calcium hydroxide based on the weight of the starch, and there was added in one case 3% (based on the weight of the starch) of b-diethyl amino ethyl chloride hydrochloride (a tertiary amine reagent); in the second case we added ethyl amino ethyl chloride hydrochloride (a secondary amine reagent); in the third case we used amino ethyl chloride hydrochloride (a primary amine reagent). The amounts of primary and secondary amine reagents employed were the molar equivalents of the amount of tertiary amine reagent. The mixtures were agitated for 16 hours at room temperature, brought to pH 3 with dilute hydrochloric acid, the starch filtered, washed, resuspended in water and gelatinized and dried over heated drums. When each dried product was mixed with water at room temperature in the ratio 1:10, the product made with the tertiary amine reagent readily dispersed to give a fluid, clear-translucent sol, whereas the products treated with the primary and secondary amine reagents gave poor dispersions, and then only to give opaque, white chunky masses which resembled those obtained from drum dried untreated corn starch. Even after standing several days, the dispersion treated with the tertiary amine-starch derivative remaided fluid and clear, whereas the other samples had become even more solid and opaque.

It is our belief that the introduction of the tertiary amine group adds a positive electrical charge to the starch molecule, and this in turn may explain the notably increased affinity of our products for negatively charged materials such, for example, as the cellulose in paper beater mixtures. It is only the tertiary amine ethers of starch which exhibit this property; starch ethers made with primary or secondary amine etherification reagents do not exhibit comparable qualities.

Being cold water soluble, our products may be shipped and stored in the dry form, and merely mixed with water at room temperature, at the point of use. The products are not only valuable as additives in paper manufacture, but are also of particular interest as adhesives, binders and thickeners, where the resistance of the dispersions to thickening or gelling upon standing, and their resistance to break-down of viscosity under acid conditions, are often of real importance.

While we have herein illustrated a number of specific reagents, and particular procedures, it is obvious that equivalents and alternative procedures will be apparent to the person skilled in the art, and such equivalents and alternatives are understood to be part of our invention, to the extent that they fall within the scope of the following claims.

We claim:

1. A dry, cold water soluble etherification product of starch having the following structural formula:

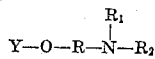

wherein Y is starch, R is a radical selected from the group consisting of alkylene and hydroxyalkylene radicals containing from 1 to 5 carbon atoms and each of $R_1$ and $R_2$ is an alkyl radical containing from 1 to 4 carbon atoms.

2. The method of making a dry, cold water soluble etherification product of starch which consists in reacting starch in an alkaline state with an etherifying agent corresponding to the structural formula

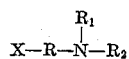

where X is a group selected from the class consisting of halogen atoms and ethylenic oxide groups, R is an alkylene group containing from 1 to 3 carbon atoms, and $R_1$ and $R_2$ are alkyl groups containing from 1 to 4 carbon atoms and thereby introducing the tertiary amino radical into the starch through the ether linkage formed by the reaction of the etherifying agent and the starch, taking said etherification product of starch in admixture with water and drying the same at a temperature sufficient to gelatinize substantially all of any ungelatinized starch granules present in the etherification product, and thereby obtaining a dry, cold water soluble starch ether.

3. The method of claim 2 wherein the etherifying agent is selected from the class consisting of dialkyl amino alkyl halides and dialkyl amino alkyl epoxides, wherein the alkyl groups contain from 1 to 4 carbon atoms.

4. The method of claim 2 wherein the etherifying agent is a b-dialkyl amino alkyl halide.

5. The method of claim 2 wherein the reaction between the starch and the etherifying agent takes place in the presence of calcium hydroxide.

6. The method of making a dry, cold water soluble etherification product of starch which consists in reacting starch in aqueous alkaline suspension with an etherifying agent selected from the class consisting of dialkyl amino alkyl halides and dialkyl amino alkyl epoxides wherein the alkyl groups contain from 1 to 4 carbon atoms, avoiding gelatinization of the starch during said reaction, and then passing the resulting ungelatinized starch ether, in the presence of at least 40% water based on the weight of the anhydrous starch, over revolving heated drums so as to gelatinize and dry the starch, thereby obtaining a dry, cold water soluble starch ether.

7. The method of claim 6 wherein the amount of etherifying agent is within the range 0.1% to 30%, based on the weight of the starch.

8. The method of claim 6 wherein the aqueous suspension of ungelatinized starch ether resulting from the reaction between the starch and the etherifying agent is pregelatinized, prior to drying on the heated drums.

9. The method of making a dry, cold water soluble etherification product of starch which is substantially free of extraneous salts, which consists in reacting starch in aqueous alkaline suspension with an etherifying agent selected from the class consisting of dialkyl amino alkyl halides and dialkyl amino alkyl epoxides wherein the alkyl groups contain from 1 to 4 carbon atoms, avoiding gelatinization of the starch during said reaction, filtering and washing the resulting ungelatinized starch ether to remove impurities, and then passing the washed starch ether, in the presence of at least 40% water based on the weight of the anhydrous starch, over heated revolving drums so as to gelatinize and dry the starch, thereby obtaining a dry, cold water soluble starch ether.

10. The method of claim 9 wherein the amount of etherifying agent is within the range 0.1% to 30%, based on the weight of the starch.

11. The method of claim 9 wherein the washed, ungelatinized starch ether is pregelatinized by heating in water, prior to drying on the heated drums.

12. The method of claim 9 wherein the washed, ungelatinized starch ether is resuspended in water and pregelatinized by passing through heated tubes, prior to drying on the heated drums.

References Cited in the file of this patent

UNITED STATES PATENTS

| | | |
|---|---|---|
| 1,805,365 | Huber | May 12, 1931 |
| 2,136,296 | Hardy | Nov. 8, 1938 |
| 2,656,241 | Drake et al. | Oct. 20, 1953 |
| 2,768,162 | Evans | Oct. 23, 1956 |
| 2,802,000 | Caldwell et al. | Aug. 6, 1957 |
| 2,813,093 | Caldwell et al. | Nov. 12, 1957 |

FOREIGN PATENTS

| | | |
|---|---|---|
| 488,418 | Canada | Nov. 25, 1952 |